United States Patent [19]
Valentine

[11] 3,990,157
[45] Nov. 9, 1976

[54] EDUCATIONAL DEVICE FOR LEARNING THE FUNDAMENTALS OF A DIESEL ENGINE AND FUEL INJECTOR SYSTEM

[75] Inventor: Charles Glenn Valentine, Stamford, Conn.

[73] Assignee: Xerox Corporation, Stamford, Conn.

[22] Filed: Dec. 14, 1973

[21] Appl. No.: 424,983

Related U.S. Application Data

[63] Continuation-in-part of Ser. No. 345,920, March 29, 1973, abandoned.

[52] U.S. Cl. .................................. 35/13; 35/7 A
[51] Int. Cl.[2] .............................. G09B 25/02
[58] Field of Search ............. 35/7 A, 8 R, 8 A, 9 R, 35/9 A, 9 B, 9 E, 10, 11, 13, 19 R, 19 A, 30, 48 R, 49, 54; 40/142 A

[56]            References Cited
       UNITED STATES PATENTS

| | | | |
|---|---|---|---|
| 1,270,369 | 6/1918 | Bishop | 35/13 X |
| 3,077,696 | 2/1963 | Barnett et al. | 35/19 A |
| 3,245,156 | 4/1966 | De Bloois et al. | 35/8 A |
| 3,423,846 | 1/1969 | Arend | 35/19 A |
| 3,514,873 | 6/1970 | Stobbe | 35/7 A X |
| 3,538,626 | 11/1970 | Frank | 35/48 R |
| 3,654,711 | 4/1972 | Taylor | 35/7 A X |

OTHER PUBLICATIONS

*Welch Physics Digest;* "Moving–Parts Models Shows Diesel Principles;" 1951; p. 26.

*Primary Examiner*—Richard C. Pinkham
*Assistant Examiner*—Vance Y. Hum

[57]            ABSTRACT

An educational kit for teaching the parts and operation of a typical diesel engine assembly is disclosed. The kit comprises audiovisual instructional equipment, a simulator board upon which is graphically depicted indicia representing a schematic diagram of a cylinder and fuel system assembly and a fuel injector, and a plurality of manipulative pieces upon which are graphically depicted schematic diagrams of various parts of a diesel engine assembly or word indicia naming various parts of said system. The pieces are adapted to be positioned on the simulator board such that the user of the kit may graphically depict the assembly, relationship of parts, and operation of a diesel engine system.

8 Claims, 7 Drawing Figures

AUDIO VISUAL MEANS

WORK SHEETS

EDUCATIONAL DEVICE FOR LEARNING THE FUNDAMENTALS OF A DIESEL ENGINE AND FUEL INJECTOR SYSTEM

This application is a continuation-in-part of applicant's copending application, Serial No. 345,920, filed Mar. 29, 1973, now abandoned.

BACKGROUND OF THE INVENTION

The present invention relates to a portable, compact and easily assembled educational kit. More specifically, the present invention is directed towards an educational kit for teaching the assembly, relationship of parts and operation of a diesel engine system comprising as the essential components thereof an audiovisual instructional means, a simulator board bearing graphic indicia thereon, and a plurality of manipulative pieces bearing graphic indicia thereon, which indicia is relatable to the indicia present on the simulator board such that the student can demonstrate his understanding of the fundamentals of the diesel engine assembly by arranging certain of the manipulative pieces on the board in a logical sequence.

A problem of increasing difficulty in the education field is that of providing a relatively simple means for instructing students, whether in the classical elementary or high school subjects, or in the various occupational technologies. The effectiveness of the traditional method of teaching involving the teacher/textbook/student relationship is measured not so much by the qualitative aspects of the information conveyed, but rather by how much of the information conveyed is absorbed, understood and learned by the particular student. In recent years, the trend in education has witnessed the introduction of a number of educational teaching devices generally aimed at the pre-college or pre-high school age group. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better change of being effective. However, at the present time, tere are very few educational devices available in the community, the junior colleges, the vocational high schools, the trade schools and other special schools where various types of occupational technologies are sought to be taught on a simplified and individualized basis.

Accordingly, it is an object of this invention to provide programmed educational kits which present information using a multimedia approach.

Another object is to provide an educational kit comprising instructional means and simulator means for teaching the assembly, relationship of parts and operation of diesel engine and fuel injection systems.

Another object is to provide an educational kit which is simple, relatively inexpensive, rugged, easily assembled, relatively portable and easily understood.

Another object is to provide an educational kit designed for use by individual students comprising audio, visual or audiovisual instructional means, a simulator board bearing graphic indicia, and a plurality of manipulative pieces bearing graphic indicia depicting schematic diagrams of parts of diesel engine and fuel injection systems, including a piston, a connecting rod, a crankshaft, a fuel injector, a cylinder, a cylinder head, a crankcase, compression rings, an oil ring, valves and others whereby the student may position the pieces at the appropriate indicia present on the simulator board in response to the instructional means to graphically depict construction of a diesel engine and a fuel injection system.

SUMMARY OF THE INVENTION

In accordance with the objects and teachings of the present invention, a simple and effective educational kit or unit for the teaching of a diesel engine assembly is provided. In addition, the kit provides for the teaching of fuel injection systems. The unit comprises instructional means, a simulator board upon which is graphically depicted indicia representing schematic views of a cylinder to be used as part of a diesel engine and a fuel injector assembly, and a plurality of pieces upon which are graphically depicted schematic various component parts of a diesel engine and fuel injector assembly or certain descriptive word indicia relating thereto. The kit may also comprise a display board which provides for storage and easy access to the various pieces when the kit is in use. The kit is designed to present the fundamentals of a diesel engine and fuel injector assembly whereby the student leans the assembly, relationship of parts and operation of said systems. This information is conveyed to the student using a programmed multimedia approach whereby the student hears and sees information, performs by answering questions, solving problems and manipulating objects.

The kit is designed for individual use or for use by small groups without the need for extensive supervision or participation by an instructor. It permits the student to learn at his own pace and also affords him the chance to capitalize on the way he learns best because he participates in different kinds of learning experiences. He listens to information while viewing a series of related visuals and participates in a manipulative activity which gives him the chance to try doing himself what he has been shown or told how to do. Each time a student learns something new, he responds to this new knowledge or skill to make sure he has learned it correctly. First, he performs an activity such as answering a question, solving a problem or manipulating a device. Then he finds out immediately if the action is correct by comparing the result of this action with the one provided by the program. If the student finds that his answer is correct, this instant feedback and learning reinforcement motivates him to continue learning. If he discovers that his answer is wrong or inadequate, he can stop at that point and find out where his error is.

DETAILED DESCRIPTION OF THE INVENTION

Various kinds of instructional means can be employed with the educational kit of this invention. For example, one of the preferred instruction means is an audiovisual presentation using slides or filmstrips in conjunction with a descriptive audio account of the visuals, presented by means of tapes or audio cassettes. A recorded narrator provides background information relating to a diesel engine and fuel injection system, including the parts thereof, how the system operates, how it compares with a conventional engine, advantages and disadvantages, and the like. During this audio presentation, a series of synchronized related visuals are shown to the students. These visuals comprise photographs or diagrams of the various parts of particular diesel engine and fuel injection systems and how they are assembled, as well as diagrams of these systems during various phases of operation. The engine and injector system chosen for this instructional kit represent standard types found in most automotive diesels. From this illustration of a diesel engine and fuel injector assembly, the principles and function of a total diesel engine system can be understood.

The audiovisual equipment needed will vary depending on the type of instruction to be given. A rear screen projector for small groups, or a projector and screen for a classroom presentation may be used. For the audio presentation, either visual projection equipment with built-in capability or a separate cassette recorder may be used. The instructional means provided with the educational kit includes a visual segment available, for example, on 35mm slides or filmstrips, and an audio segment available on cassettes. The supporting equipment is normally not included with the kit.

At various points during the presentation, the student is requested to stop the audiovisual presentation and perform certain activities using the simulator board and pieces associated therewith. For example, he may be requested to position pieces depicting the piston, the fuel pump, the fuel filter, the fuel tank, and the like in their proper positions relative to the cylinder diagram present on the simulator board, and label the various components so placed using other pieces bearing indicia naming these parts thereby constructing a diesel engine. The simulator activity thus allows the student to use his hands as a learning tool, as well as his eyes and ears. By performing an activity using the simulator board and it accessories, the learning process is reinforced and the student takes an active part in learning and achieves understanding more quickly.

DETAILED DESCRIPTION OF THE DRAWINGS

Figure 1:
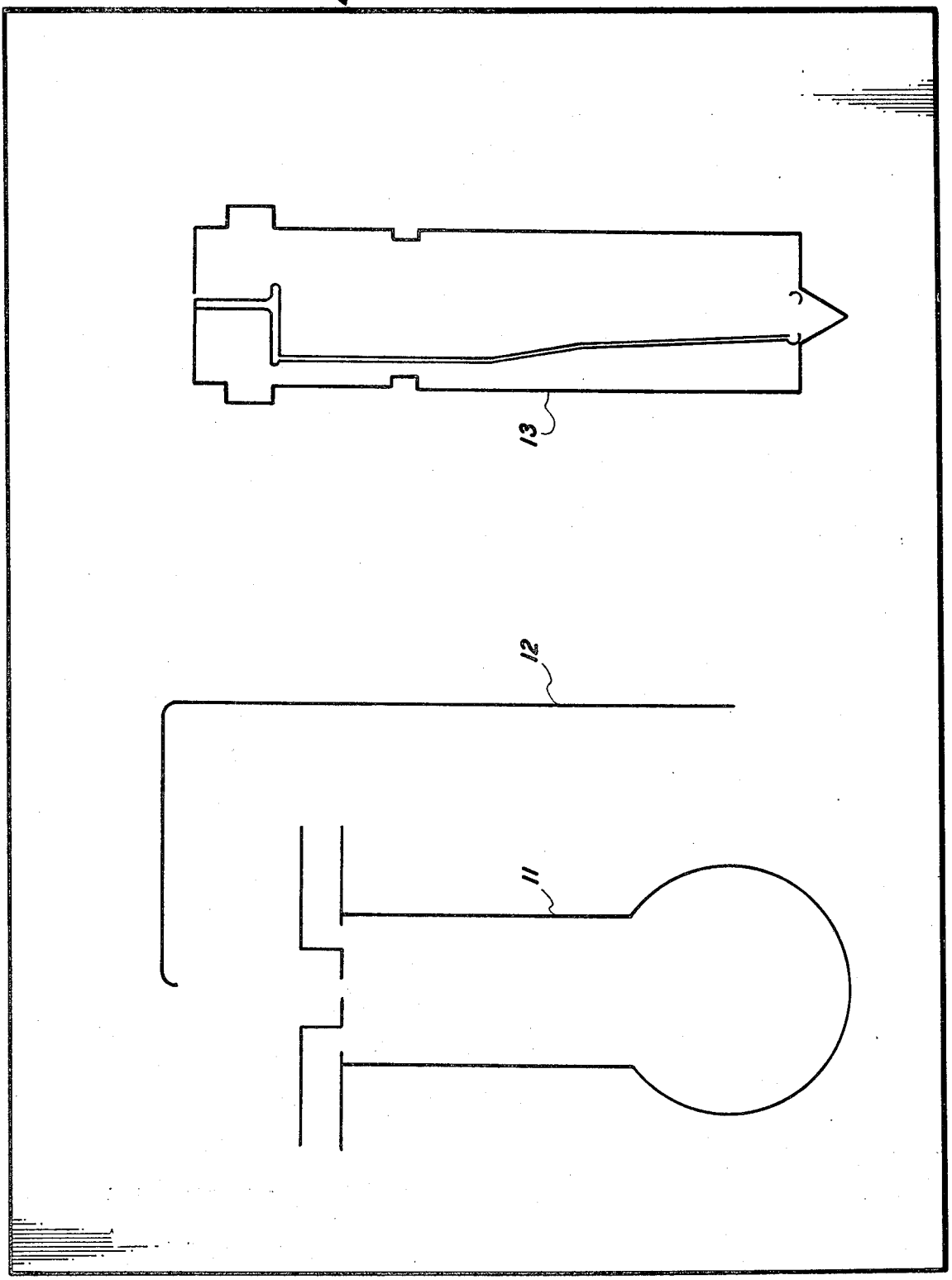
FIG. 1 is a plan view of the simulator board with graphic indicia thereon.

In FIG. 1 the simulator board 10 is shown having printed thereon graphic indicia depicting a schematic side view of a cylinder 11, a line representation of a fuel system 12, and a fuel injector 13. These diagrams serve as locations for positioning the manipulative pieces in order to simulate the assembly and operation of a diesel engine system which will be hereinafter described.

The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of metal with suitably smooth edges, the metallic sheet may also be laminated to a suitable backing member which imparts suitable rigidity thereto. Thus, the simulator board may comprise a thin sheet comprising ferrous metal having a thickness of about 1/32 inch laminated to a backing member made from a rigid material such as Masonite, fiberboard, or a resinous material, said backing material having a preferred thickness of about ¼ inch. The dimension of the simulator board should be such that the board can be conveniently used by the student at a given work place. Boards having dimensions of about 15 × 20 inches, or approximately 300 square inches, are particularly suitable.

Figure 2:
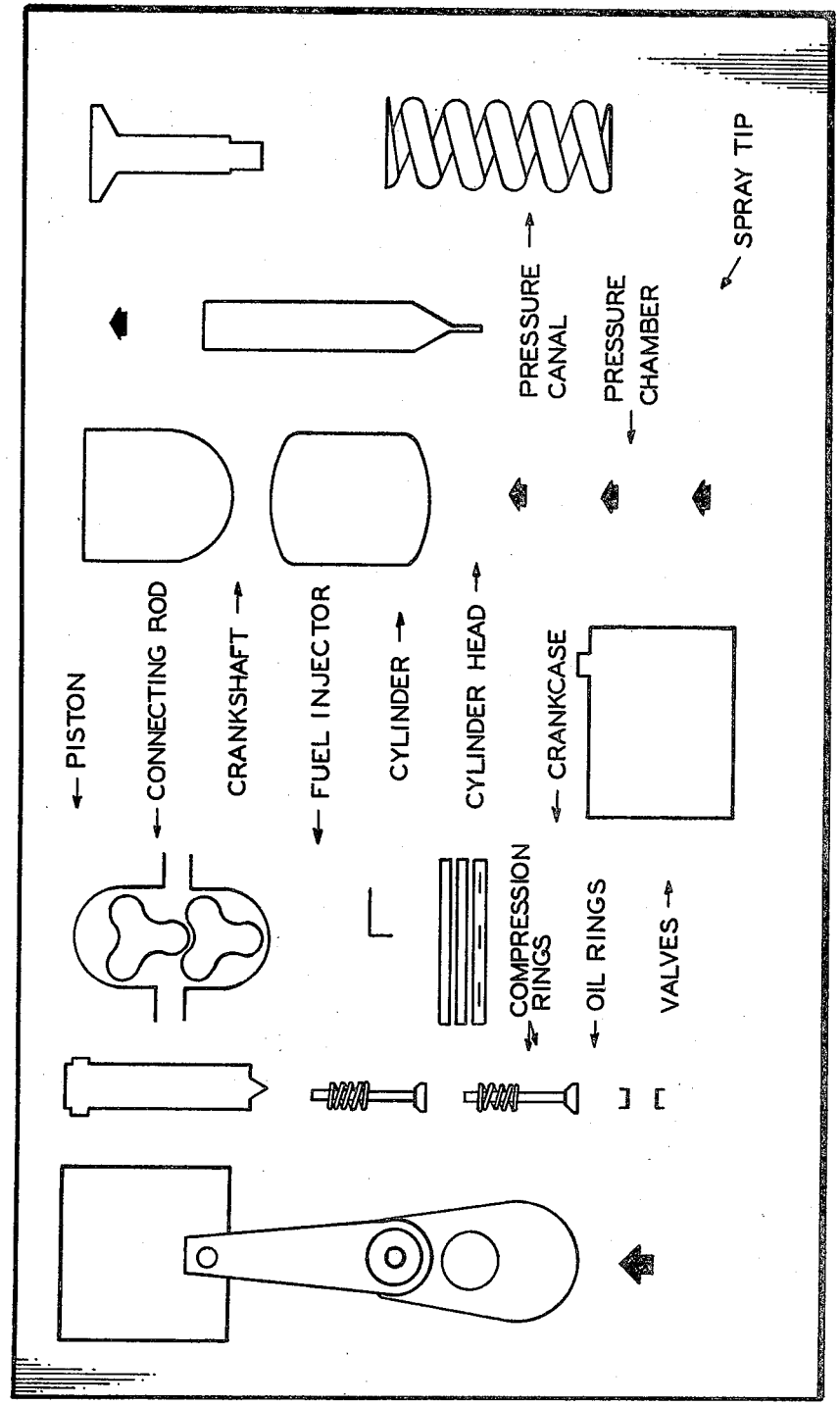
FIG. 2 is a plan view of the display board with graphic indicia thereon.

In FIG. 2 the display board is shown having printed thereon graphic indicia depicting various parts for a fuel injection system and a diesel engine and certain descriptive word indicia. The display board is also constructed on a magnetically attractive material similar to the simulator board and the background indicia may be printed thereon in the same way. The purpose of the display board is to serve as a display and storage area for the magnetically attractive pieces which are used in conjunction with the simulator board. Each of the graphic inidica printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
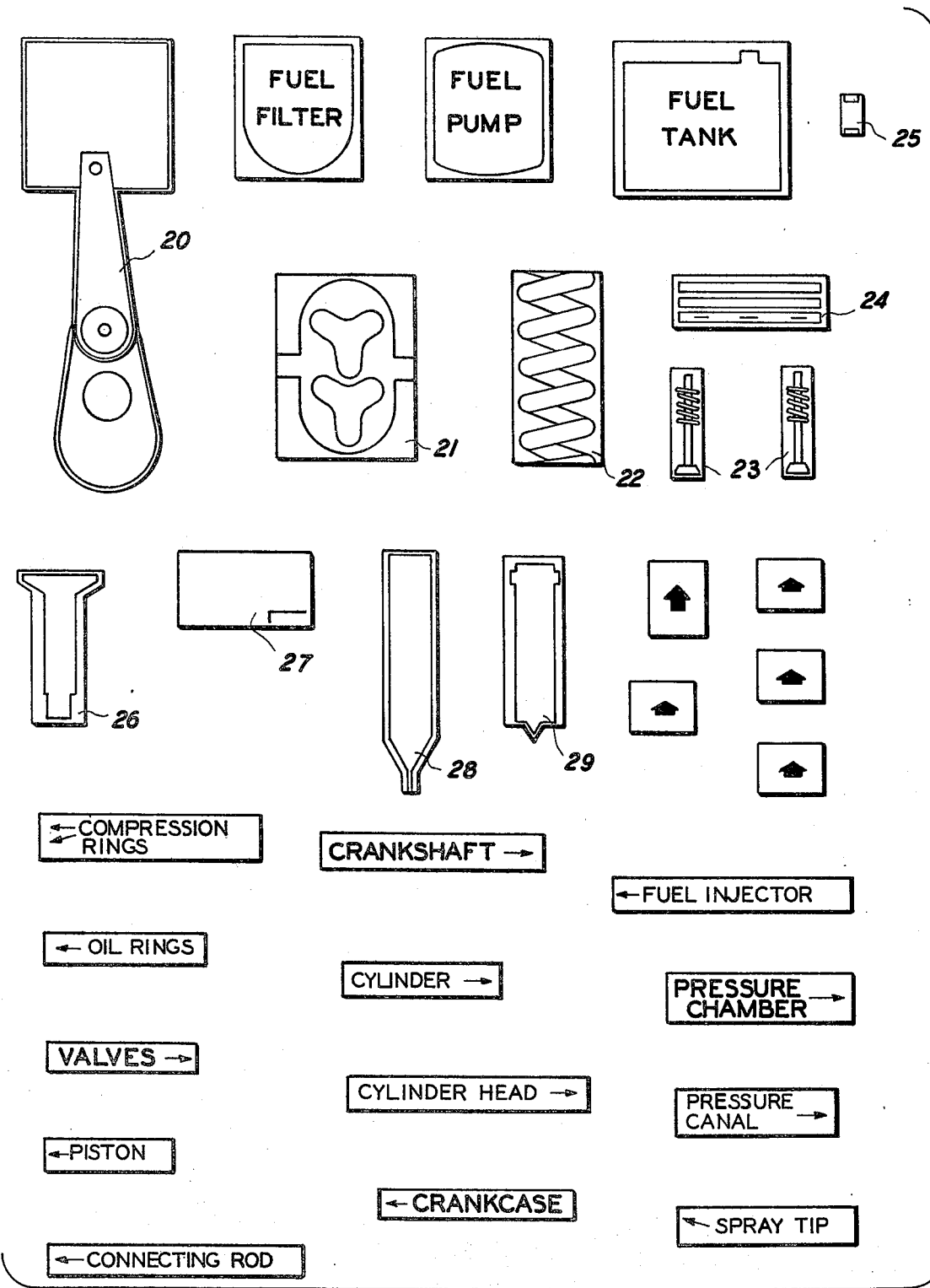
FIG. 3 is a plan view of some of the manipulative pieces having graphic indicia thereon.

The manipulative pieces used in the educational kit of this invention are shown in FIG. 3. Each of these pieces is made of a flat sheet of a rigid material such as metal or plastic and has laminated to the underside thereof smaller pieces of a magnetically attractive material such as metal or ferrite plastic. The preferred thickness of the pieces is approximately 1/16 inch and the thickness of a smaller section laminated to the underside of the pieces is about 3/32 of an inch.

As shown in FIG. 3, some of the pieces bear indicia depicting schematic side view diagrams of various of the component parts of a diesel engine and fuel injection system and other of the pieces bear word indicia. Piece 20 depicts a piston with a connecting rod and crankshaft, piece 21 represents a scaveneger blower, piece 22 respresents a compression spring, pieces 23 represent valves and springs, piece 24 represents compression rings, piece 25 represents an intake port, piece 26 represents a thrust pin, piece 27 represents a close off section, piece 28 represents a needle valve, and piece 29 represents a fuel injector. All the remaining figures are self-explanatory or have evident functions. For example, the arrows represent directional motion of the instant systems.

In FIG. 3 there is shown pieces bearing word indicia such as "CYLINDER" and "VALVES" and each having an arrow to facilitate designation of the particular part when used in conjunction with the schematic of FIG. 1. Specifically, a piece designating an element of one of the subsystems of FIG. 1 may be placed outside of the system with the arrow appropriately pointing out said element. Also shown are five pieces depicting arrows which may be used to show directions of motion of the instant assemblies.

All of the depicted pieces in FIG. 3 are adapted for use in conjunction with the cylinder and fuel injector schematic of the simulator board such that the student may simulate the construction and operation of a diesel engine or fuel injector system. For example, by properly superimposing piston piece 20, the intake port 25, the scavenging blower 21, and the close off section 27, on the cylinder element 11 of FIG. 1, the student can visulize and understand the fundamental construction and function of diesel engines. a still broader understanding of the diesel engine and fuel injector construction and mechanism is afforded the student by proper placement and manipulation of all the pieces into the cylinder element 11 and the fuel injector element 13 of FIG. 1.

Figure 4:
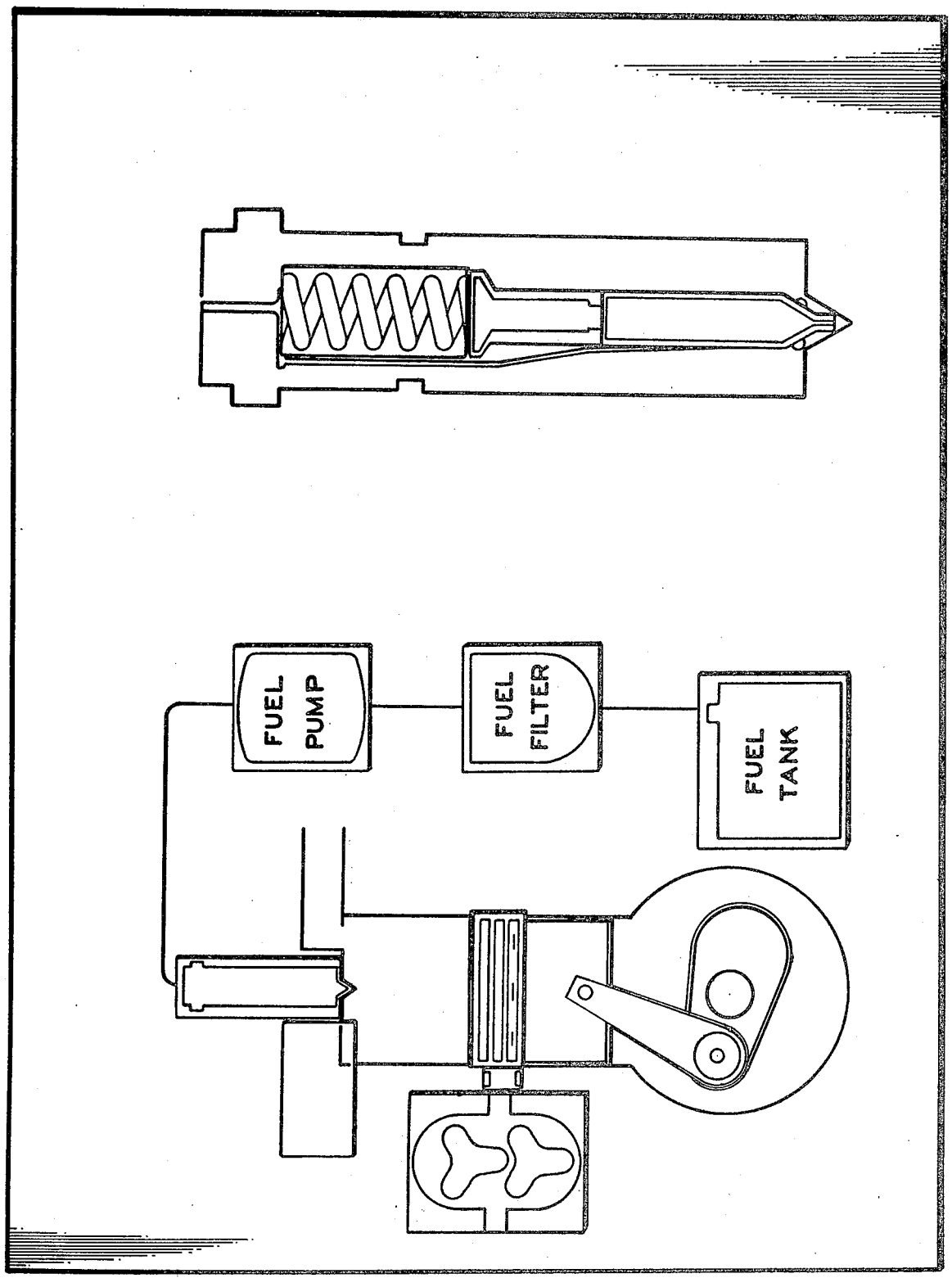
FIG. 4 is a plan view of the simulator board with certain of the manipulative pieces in place.
Figure 5:
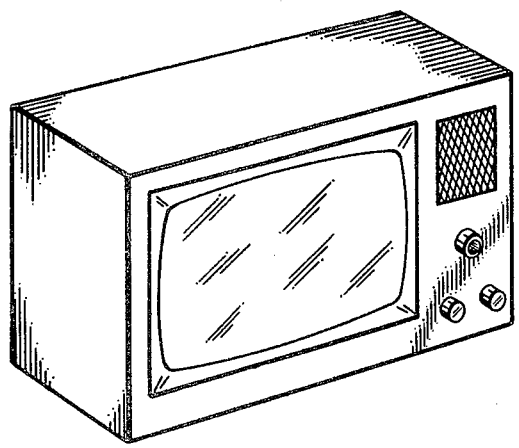
FIG. 5 illustrates generally an audiovisual device suitable for use in the present invention.
Figure 6:
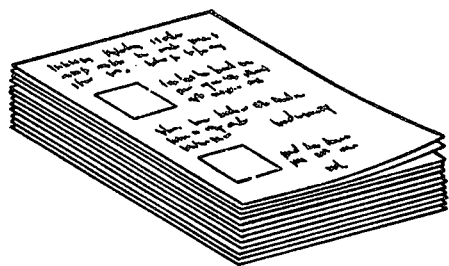
FIG. 6 illustrates generally worksheets in accordance with the present invention.
Figure 7:
FIG. 7 is a side sectional view of a typical manipulative piece in accordance with the invention showing smaller magnetic sections laminated to the underside of the piece.

In FIG. 4, the simulator board is shown with certain of the manipulative pieces in place. On the cylinder portion of the board 11 the general assembly of a diesel engine mechanism has been constructed by superimposing within the cylinder schematic pieces 20, 25, 21, and 29 as well as the pieces representing the "FUEL PUMP", the "FUEL FILTER", and the "FUEL TANK". On the fuel injector portion 13 of the simulator board, pieces 22, 26 and 28 are inserted to reconstruct a fundamental fuel injector. While use of all the pieces within both figures of the simulator board results in a full construction of a diesel engine and fuel injector, this presentation depicts the simple principle of piston motion within a diesel engine and the fundamental parts of a fuel injector.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need only be of a material that is attracted to a magnet. In the simpler and preferred embodiment, the bases of the pieces have laminated thereto a section of a magnetic material such as magnetic plastic or metal, and the boards are made of material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student work sheets, sample tests or quizzes to be given by the instructor before and after use of the unit, and an instructor's manual.

To illustrate how the educational device of the present invention is used, the audiovisual presentation begins with a brief discussion of the principles of an internal combustion engine. This includes a description of the four stroke cycle of an oridnary piston engine. The construction of a cylinder containing a piston is depicted using diagrams as well as an explanation of the principles of intake, compression, power and exhaust. Therefore, the continuous motion of a piston in a conventional gasoline engine is fully articulated. The function of a crankshaft, which is the element linked to all the pistons by connecting rods in an automobile engine, is fully described. After the discussion of each of the four strokes the piston in the engine cycle, the discussion focuses on the principles which result in the conversion of heat energy to mechanical energy. Thus, the compression pressure in a gasoline and diesel engine are compared as well as the temperature of a compressed gas in the cylinder of a diesel and gasoline engine. It is pointed out to the student that a conventional gasoline engine requires a spark plug whereas a diesel engine does not inasmuch as the latter does not require ignition due to the extreme heat resulting from enormous pressure of the air compressed in the diesel cylinder.

At this point in the audiovisual presentation, the student is introduced to the principles of the diesel engine and how it contrasts with the gasoline engine. It is explained that a diesel engine is called a compression-ignition engine for the reason that ignition occurs due to the extreme pressure of the compressed air. When combustion occurs in a diesel engine, the temperature of the burning gases can reach as high as 4,500° F. The pressure resulting from the explosion of these compressed gases can go as high as 1,500 pounds per square inch which comes from the extreme power of a diesel engine. In addition, the student appreciates why diesel engines are built stronger and heavier than gasoline engines. With this particular aspect of the presentation the student is given numerous examples of application of a diesel engine, such as heavy-duty trucks, fire engines, and earth moving equipment.

At various points throughout the audiovisual presentation, the student is requested to turn to the simulator board and accessory pieces associated therewith in order to physcially simulate the construction assembly of the component parts of the diesel engine. For example, the function of the cylinder can be depicted by positioning the piston 20 within the cylinder component 11 of FIG. 1 and moving movable piston element 20 about the crankshaft by means of a connecting rod so as to simulate the motion of same in a diesel engine.

Subsequently in the audiovisual presentation, the student is introduced to the difference between a four storke cycle and a two stroke cycle. Therefore, it is explained that in a four stroke cycle one power stroke is made for every two revolutions of the crankshaft whereas in a two stroke cycle one power stroke is made each time the crankshaft makes one complete revolution. It is further explained that in a two storke engine, the piston works in conjunction with an intake to take the place of an intake valve of such an engine. At this point, pieces 25 and 22, the intake port and the scavenger blower, are explained in conjunction with an explanation of a two stroke diesel engine.

And further on the audiovisual presentation turns to a discussion of piston heads and their components. It is explained that compression rings are used in both the conventional gasoline and diesel engine to seal the area between the piston and the cylinder walls, the rings fitting into grooves on the outside of the piston and are usually made of cast iron. In addition to preventing leakage in the crankcase, it is explained that the compression rings serve to retain the flow of air in the combustion chamber as it is being compressed. There are generally two compression rings on a diesel engine piston, but there may be more, especially in the case of heavy-duty engines. This particular section further goes on to introduce the student to the concept of an oil ring. It is explained that an oil ring fits into a groove on the piston below the compression rings whereby it functions to prevent excess lubricating oil from getting on the cylinder wall or into the combustion chamber. It is further explained that oil rings differ from compression rings and that oil rings have vents or holes in them for the oil to flow through.

Again the student is invited to go to element 11 of FIG. 1 and place the various manipulative pieces explained (i.e., piston, compression rings, scavenger blower, etc.) into cylindrical element 11. Note the left side of FIG. 4 where the piston 20, the compression rings 24, the intake port 25, the scavenger blower 21, the close off section 27 (used in a two cycle diesel engine), the fuel injector 29, and the various fuel apparata pieces are used to reconstruct a two cycle diesel engine. In addition, the student is also directed to place the descriptive magnetic pieces into place with their respective arrows pointing to the particular element placed onto the simulator board. Therefore, the student would have placed the manipulative piece designated "←PISTON" outside of element 11 of FIG. 1 so that the piston element is properly designated.

At this point in the audiovisual presentation, the instructional means turns to a detailed discussion of one of the more important features of a diesel engine, the fuel injection system. It is explained that unlike the gasoline engine, the diesel engine has no carburetor, and therefore air alone is compressed in a cylinder of a diesel engine and the fuel subsequently injected into it. At this point, the student is introduced to a fuel injector. It is explained at the end of the compression stroke in a diesel engine, the fuel injector sprays fuel oil into the air compressed in the cylinder and the heat of the air causes combustion.

While there are many different types of fuel injection systems, they all have certain basic elements in common. Fuel injection involves moving fuel from a fuel tank to a fuel pump, which pumps the fuel to the fuel injector for each cylinder. The student at this point is invited to place these three elements i.e., the fuel pump, the fuel filter and fuel tank along the line from the top of the cylinder 11 to the bottom of the board. At this point, various fuel injector systems are described and explained. Therefore, three of the most common systems of fuel injection, common rail, multiple pump and unit injection systems, are fully described.

The discussion then turns to various aspects of a fuel injection such as compression, power, and spraying fuel at proper angles. It is further demonstrated that fuel injectors are made of precision parts and that they have such small tolerances that any dirt that enters may clog it and cause malfunction of the system. It is for this reason that the fuel be free of foreign particles and therefore the need for a fuel filter.

At this point the student's attention is directed to the right-hand side of simulator board FIG. 1 where element 13 represents the outline of a fuel injector. The student is then invited to place the needle valve 28 of FIG. 3 into element 13. It is explained that in a fuel injector the needle valve closes off the spray tip and lifts only after fuel under pressure from the pump, reaches the valve. The student is then directed to take the thrust pin element 26 and place it within fuel injector 13 of FIG. 1. Next, the student is requested to locate the magnet which represents the compression spring 22 and place it in the fuel injector. In this manner the student recreates a fuel injection system shown on the right side of FIG. 4. The student is further invited to label each of the elements with their particular magnetic designations. The final part of this section describes the details of many fuel injection systems and their application to particular diesel engines.

The above described educational kit thus provides the student with an opportunity of exploring concepts involved in the operation of a diesel engine assembly by simulating the construction and arrangement of parts involved in such a system. The educational kit is programmed such that the student will encounter a minimum of frustration and a maximum learning efficiency during the use of the kit. Upon completion of the kit, the student should be able to list the strokes of a four stroke cycle and tell what happens in a gasoline engine cylinder and in a diesel engine cylinder as the strokes are performed; identify the strokes of a four stroke cycle when given diagrams showing the position of the piston, crankshaft, connecting rod, valves, the direction of piston movement and the direction of crankshaft revolution; describe how the two stroke cycle is performed in a diesel engine and how it differs from a four stroke cycle; list the major components of a fuel injection system; know various distinctions between a diesel and gasoline engine with regard to the use of spark and/or carburetors; compare what enters the cylinder of a diesel engine on an intake stroke as opposed to what enters the cylinder of a gasoline engine on the same stroke; list three types of fuel injection systems for the diesel engine; state which type of cycle requires a scavenging blower; state which components of the multiple pump and unit injector fuel injector systems perform the greater portion of the metering function; compare a diesel engine and gasoline engine of the same horsepower stating which is larger, which is heavier; state why there are special fuel lines from the high pressure fuel pump to the fuel injector in the multiple pump injection system; identify a spark plug and a glow plug when shown these parts; state what chamber allows for partial burning of the fuel oil before it enters the combustion chamber; identify five of six major parts of a fuel injector when given a diagram; state in what form the fuel enters the cylinder of a diesel engine; classify piston and rings, cylinder, connecting rod, cylinder head, crankshaft, crankcase, valves, and fuel injector as moving and nonmoving parts; state three things controlled by the high pressure pump metering functions; define turbulence chamber; identify the fuel injectors location and the cylinder head; and recognize the fuel requirement difference for gasoline and diesel engine.

A complete description of the educational kit encompassed by the present invention may be found in the booklet entitled "Automotive Technology - Diesel Engine Fundamentals" (Unit 10239-80), published as part of the Occupational Technology Series of the Xerox Corporation.

What is claimed is:

1. An educational kit for teaching the assembly, relationship of parts, and opertion of a diesel engine and fuel injector assembly comprising:
    a. a simulator board having a surface of magnetically attractive material and having (i) on a first area of said board graphic indicia on the surface thereof defining a sectional view of a diesel engine, including a cylinder and a fuel system, and (ii) on a second area of said board graphic indicia defining a fuel injector assembly both areas of said board being educationally integratable in teaching a diesel and fuel injector system, the indicia on said simulator board being as shown by the non-numerical indicia of FIG. 1;
    b. a plurality of magnetically attractive manipulative pieces each bearing individually on their surfaces graphic indicia defining items found within diesel engine and fuel injector assembly, said pieces comprising (i) a plurality of pieces each containing indicia defining elements found within a diesel engine and fuel injector assembly; and (ii) a plurality of pieces each containing word indicia defining various segments of a diesel engine and fuel injector system, the pieces being adapted for manipulation within the confines of the two defined areas of the simulator board, the indicia on said manipulative pieces being as shown by the non-numerical indicia of FIG. 3;
    c. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board; and
    d. audiovisual instructional means for presenting information relevant to the basic principles about diesel engine and fuel injector systems including information defining (i) the first and second areas of said board, (ii) the indicia on the manipulative pieces, (iii) the indicia on said board, (iv) the relationship of the inidica on the two areas of the simulator board to the indicia on said pieces and use of same on said board whereby the assembly, relationship of parts, and operation of a diesel engine and fuel injector system can be learned by the user by using said board in response to said instructional means.

2. An educational kit according to claim 1 wherein said manipulative pieces are magnetic.

3. An educational kit according to claim 1 wherein said manipulative pieces comprise a flat sheet of rigid material having smaller sections of a magnetic material laminated thereto.

4. An educational kit according to claim 1 wherein the indicia depicted on said manipulative pieces comprise schematic diagrams of parts of a diesel engine and fuel injector system including a compression spring, a piston comprised of a crankshaft and connecting rod portions, a scavenger blower, an intake port, a thrust pin, a needle valve, and a fuel injector and word indicia naming various of the parts of said diesel engine system.

5. An educational kit according to claim 1 wherein said audio instruction means includes tape recordings which are synchronized with said visual instruction means which includes slides or filmstrips.

6. An educational kit according to claim 1 wherein said instruction means includes a plurality of student work sheets, said work sheets being adapted for use by the student to record information and test the student in response to said audiovisual instruction means.

7. An educational kit according to claim 1 wherein said simulator board, said manipulative pieces, and said display board are constructed of a substantially rigid material.

8. An educational kit according to claim 1 further comprising a compartmentalized case, said case being adapted for storage of said kit.

* * * * *